United States Patent [19]
Fort et al.

[11] 3,930,145
[45] Dec. 30, 1975

[54] DATA ACQUISITION AND PROCESSING SYSTEM

[75] Inventors: J. Robert Fort; James A. Westphal, both of Altadena; C. Hewitt Dix, Pasadena; Donald R. Juiles, Chatsworth, all of Calif.

[73] Assignee: Geophysical Systems Corporation, Pasadena, Calif.

[22] Filed: May 7, 1973

[21] Appl. No.: 358,076

[52] U.S. Cl. .......... 235/151.3; 340/15.5 DP; 340/15.5 TS; 340/172.5
[51] Int. Cl. .......... G01v 1/28
[58] Field of Search .......... 235/151.3, 181, 152; 340/15.5 DP, 15.5 TS, 15.5 CP, 172.5; 346/33 C

[56] References Cited

UNITED STATES PATENTS

| | | | |
|---|---|---|---|
| 3,652,979 | 3/1972 | Angelle | 340/15.5 TS UX |
| 3,698,009 | 10/1972 | Barbier | 340/15.5 CD |
| 3,744,019 | 7/1973 | Schmitt | 340/15.5 CD |
| 3,748,638 | 7/1973 | Montgomery, Jr. et al. | 340/15.5 TS |

*Primary Examiner*—Joseph F. Ruggiero
*Attorney, Agent, or Firm*—Daniel Silverman

[57] ABSTRACT

This abstract describes a system for acquisition of analog signals at a plurality of sensors, carrying these signals in goups of M channels to each of N spaced-apart array terminals, processing each signal in the array terminals by separately amplifying, adding to a shifting function of selected amplitude, axis-crossing-coding these sum signals and storing as single bit pulses, one for each channel, in a parallel-to-serial converter. Each of the converters in each of the array terminals are operatively connected in series and to an array controller, which also controls a disc magnetic recorder to run at constant speed. The disc generates a disc clock, and responsive to the disc clock the converters are read out in series as a sequential train of MN bits and stored on the disc. Successive samples at subsequent digitizing intervals are stored on the disc, to form a first record. Subsequent records are processed, coded and recorded, and composited with previous records on the disc. After a plurality of records have been composited the stacked series is read off the disc in demultiplexed form, and stored in a computer memory. The resulting traces are than processed by a computer and FFT box.

7 Claims, 2 Drawing Figures

DATA ACQUISITION AND PROCESSING SYSTEM

CROSS REFERENCE TO RELATED APPLICATIONS

This application is related to three other applications assigned to the same assignee as this application and filed on the same date as this application May 7, 1974. The titles of the other three applications are as follows: DATA ARRAY NETWORK SYSTEM U.S. Pat. Ser. No. 358,097; DATA ACQUISITION, TRANSPORT AND STORAGE SYSTEM U.S. Pat. Ser. No. 358,077; and DATA COMPOSITING AND ARRAY CONTROL SYSTEM U.S. Pat. Ser. No. 358,078. These three applications are incorporated into this application by reference.

BACKGROUND OF THE INVENTION

This invention is in the field of data acquisition and processing systems. More particularly, it is concerned with apparatus and methods for detecting analog signals at widely spaced locations, coding these signals and transmitting them as trains of single bit digital pulses over a single pair of conductors to a distant recording unit, where a plurality of records are composited on a magnetic disc means. The composited records are read out in demultiplexed form and stored as separate traces in a computer memory.

Still more particularly it concerns a system in which a plurality of separate detectors produce analog signals which are amplified, added to a shifting function of controlled amplitude, and axis-crossing-coded and transmitted by a two conductor cable to a disc recording means, and there composited with succeeding repetitions of the signals, demultiplexed and processed.

While this invention is useful in the acquisition of any type of analog signals such as in the field of data collection, vibration analysis, sonar signaling, nuclear technology, and so on, it is most appropriately useful in the area of seismic prospecting and as a matter of convenience will be discussed in that application.

In the prior art systems the seismic signals detected by the geophones have normally been transmitted by separate pairs of conductors to the recording truck. Here they are amplified in high gain, gain ranging amplifiers, multiplexed into sequential amplitude samples of successive traces, and digitized to fifteen or more bits, after which they are temporarily recorded on a magnetic medium. The next repetition of the elastic wave signal is processed in a similar way and successive amplitude measurements of a given trace at a given time are summed and the sum is again recorded on the magnetic medium such as a magnetic tape. The tape is then sent to a distant computer center, where the composited records are processed.

SUMMARY OF THE INVENTION

It is a primary objective of this invention to provide a data acquisition, transmission and compositing system in which a great plurality of separate geophone channels are coded and multiplexed and transmitted to a disc recording means, and, under control of the disc recording means stored in preselected spaced locations, so that on a synchronous basis, a second record can be transmitted to the recording means, added to the record previously received, and the sum record rerecorded in the same storage locations. The stacked records are then read out in demultiplexed form to computer memory and processed trace by trace.

It is further and important object to record a plurality of analog signals in a form where the amplitude information is preserved, but the data are stored as single bit trains, stacking a plurality of records to recover the amplitude information; and processing the resulting staced traces, to provide, in essentially real time, information to guide the field operations.

This and other objects are realized and the limitations of the prior art are overcome in the present invention which differs in a number of ways from the prior art systems. In particular, the plurality of seismic signals that are detected in the field are divided into groups and processed in a plurality of array terminals, by being amplified and added to a shifting function. In each of the plurality of array terminals there are a different plurality of geophone signals which are processed in a similar manner. The processed signals from the array terminals are impressed on a cable which serially passes through each of the array terminals.

This cable is connected to an array controller in the recording unit, or truck. The array controller combines a number of operations. First it has two magnetic storage discs, of which one is always driven in synchronism with a clock. The controlled disc generates control pulses in synchronism with its rotation. Commands responsive to the control pulses call for periodic coding of the signal plus noise and serial transmission of the coded pulses to the disc, where they are stored in spaced address locations.

Inasmuch as the time intervals at which the coding is done must coincide with the times at which specific addresses pass beneath the write heads on each track, it is important that the disc become the controlling time source or clock of the recording system. The disc is driven by a programmable oscillator which drives a power amplifier which drives the motor which drives the disc at the rate of one revolution in 32 ms.

The array controller using this control pulse from the disc, sets up a timing procedure by which it initiates commands which are sent to the array terminals to provide signal processing activities. After the geophone signal has been added to the shifting function, the sum signal is sent to an axis-crossing-coder. There are a plurality of these, one for each of the M geophone channels in each of the N array terminals. These AXC can be commanded simultaneously to axis-crossing-code the sum signals. This produces a simultaneous plurality of short duration pulses which are either +1 or 0, depending on whether they occur on one side or the other of the axis crossings of each channel. These coded pulses are stored in a parallel-to-serial converter. This coding process is repeated at selected first intervals of time, for example, just prior to the digitizing intervals.

At fixed second selected time intervals, corresponding to the times of digitization, which may be one, two or four milliseconds, etc. apart, for example, the parallel-to-serial converter is commanded to read out the stored bits in serial order. These are transmitted to the array controller on a two conductor pair. Simultaneously each of the other array terminals read out the signals stored in their converters and send them to the next in series terminal, and so on. Thus a first sample from each trace of the entire plurality of NM traces is provided as a flow of one bit signals to the disc storage. These bits are stored on the disc in appropriate addresses which are arranged in a first spaced relation. Because of the specific speed of the disc, the speed of read out of the data is selected so that the train of bits will be stored in the proper addresses.

This first sequence of bits represents all of the information on all traces at the first digitizing interval. This procedure is repeated at each digitizing interval on command from the controller, until the complete signal traces for the entire group of geophones has been recorded on the disc as a first record.

Next, a repetition of the elastic wave signal is impressed on the earth, and another complete set of channels are detected, coded, multiplexed and recorded on the disc. There is space on the disc for two complete records, or sets of traces at any one time. When the fifth (for example) record is being recorded it is recorded on the disc in the same positions as the fourth record, the fourth record having been read out, simultaneously added to the sum of the first three records and placed back on the disc as the sum or composite of four records. This composite, or partial sum, is recorded in a second group of addresses in second spaced relation.

When the full number of repetitions or sweeps to be run are completed, and all the traces are composited, the first disc is filled. The control connections are switched to a second identical disc and it is brought to synchronous control by the computer. Thereafter, a second set of repetitions are carried out and the geophone signals are brought in and recorded on the second disc, repeating the operation just described on the first disc.

While the second disc is being filled, with repeated recordings of successive repetitions of the sweep signal in the earth, the first disc is being unloaded into a computer memory. The data are recorded on the disc in multiplexed form, in cross trace bits at each digitizing interval. When they are read off the disc, they are converted (demultiplexed) to consecutive digitizing intervals for each trace, or channel, then the next trace or channel, and so on. In the computer memory, the data will be in trace form, so they are then ready for computer processing.

Although the signals as transmitted from the array terminals to the disc are one bit signals, by repetition of sweeps and compositing the records, the words representing digitized measurements on each trace will accumulate up to eight bits, depending on the number of repetitions. There is provision for storage on the disc of eight bit words, and similarly in the computer memory. The computer memory is now organized on a trace storage basis.

Having the data in computer memory, and having a fast Fourier transform box, it is possible, while a new record is being recorded to process a correlation, for example, of the previous record with a sweep signal, or to do convolution processes using the computer and the FFT, etc. As the traces which are stored in core memory are processed with the FFT they can be recorded on a third disc. When the record has been completely processed, it can be transferred from the third disc, for example, to a tape for storage until additional processing can be done, or for archival storage. The combination of disc and tape units, with the computer and the FFT, is such that a wide flexibility or processing operations can be handled.

The equipment also includes a graphic terminal and keyboard by means of which the computer can be interrogated in many preplanned ways. Also any of the data stored in the core memory, or on the disc, or being processed, can be played out on an electrostatic printer under control of the computer.

The present invention is concerned with the array terminals, the disc system and array controller, and the data read out means, computer memory, computer and FFT box. These operate as a complete data acquisition, transport, compositing and processing system.

This information acquisition and transmission system is ideally suited for gathering time function information from a plurality of distributed locations, processing these into the form of axis-crossing-coded signals that can be multiplexed from the entire plurality of separate channels onto a two conductor cable into the storage device. The description of this information system as a seismic system is purely coincidental and there is no limitation to the use of this system intended by its description in this manner.

Furthermore, this particular data acquisition system is intended to be used in conjunction with a plurality of array terminals and a means for controlling the data handling operations and the compositing of successive records and so on. The additional equipment and methods involved in these additional operations are described and claimed in three additional patent applications which are being filed on the same date as this application. These three additional applications are introduced into and made part of this application by reference and this reference material is intended to supplement the description provided in this specification.

BRIEF DESCRIPTION OF THE DRAWINGS

These and other objects of this invention and a better understanding of the principles and details of the invention will be evident from the following description, taken in conjunction with the appended drawings, in which.

DESCRIPTION OF THE PREFERRED EMBODIMENT

Figure 1:
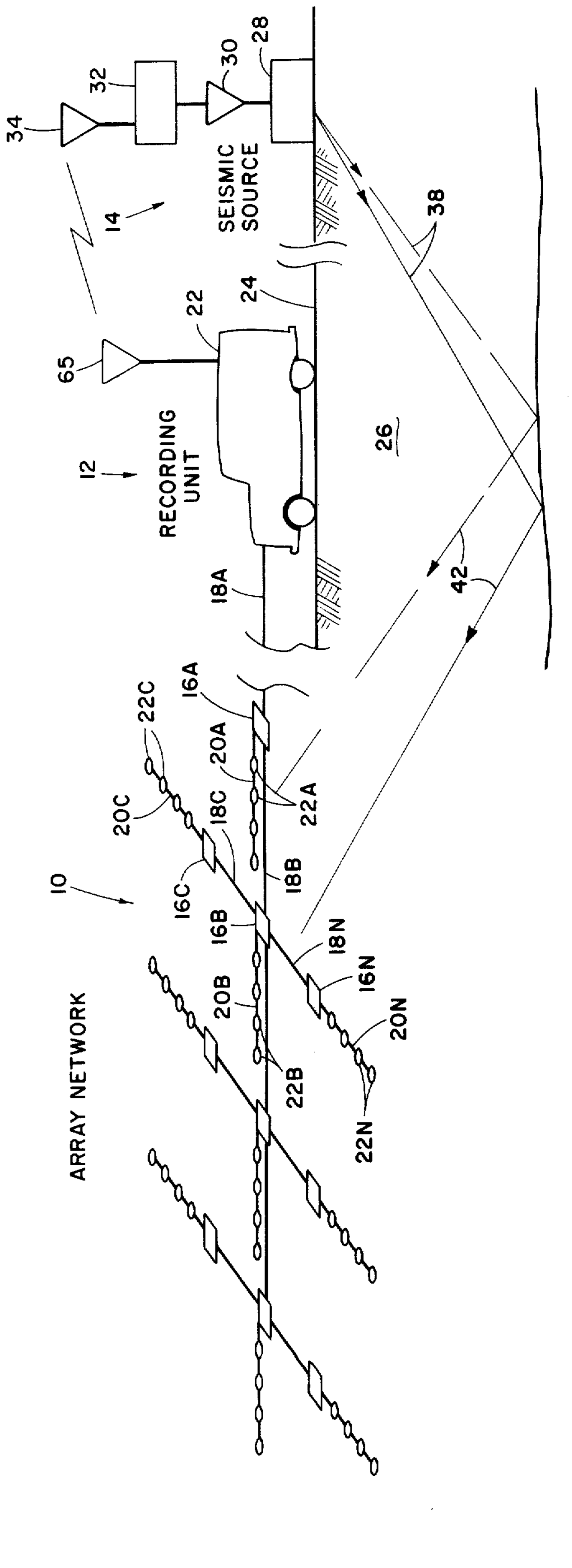
FIG. 1 represents a schematic form the operation of impressing on the earth a seismic signal, having the elastic waves propagate through the earth to, and be reflected upwardly from a subsurface interface to the earth's surface, to be detected by an areal spread of detectors joined in groups to separate array terminals, which are series connected by short cable lengths, to a recording unit.

Referring now to the drawings and in particular to FIG. 1, there is shown in schematic form an array network of terminals and detectors indicated generally by the numeral 10, a recording unit indicated by the numeral 12, and a source of seismic waves which can for convenience be an electrohydraulic vibrator which is used to impress elastic waves on the earth. A plurality of array terminals indicated by the numerals 16A, 16B, 16C . . . 16N are connected in series connection by means of cables 18B, 18C . . . 18N and to the recording unit by means of the cable 18A.

Each array terminal has a multiconductor cable to which are connected a plurality of detectors, sensors or geophones, which can be placed on the surface 24 of the earth 26 in a geometric pattern of selected form.

There may be a group of M separate detectors carried to each of a selected number N of terminals. Each of the detectors is connected to a separate two conductor pair to the array terminal. As will be described in connection with FIG. 2, the detected analog signals received from the geophones are processed in each of the terminals and converted to digital form.

Figure 2:
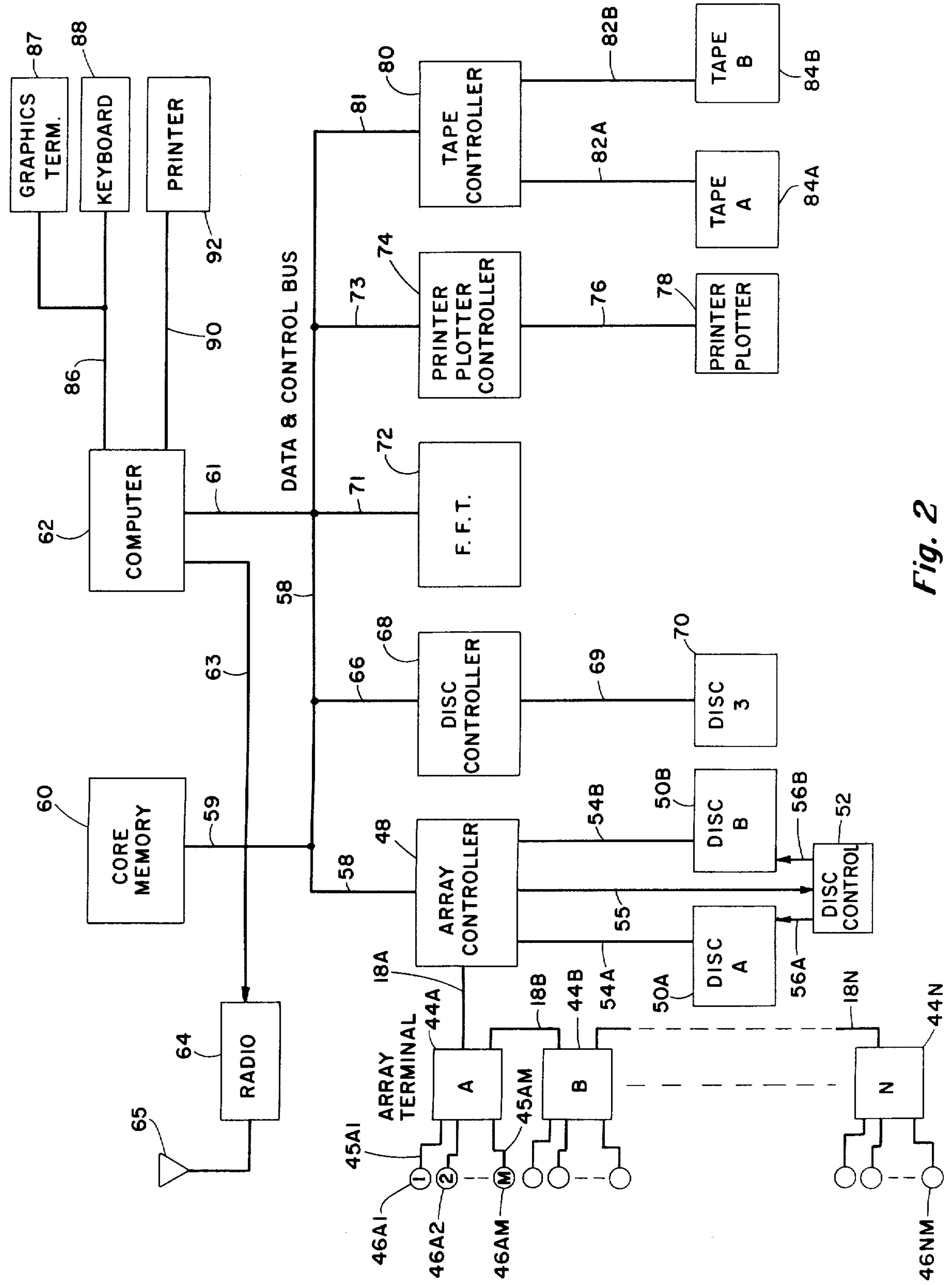
FIG. 2 is a schematic diagram of the complete recording system exclusive of the seismic elastic wave generator.

In the recording unit, as will be described in connection with FIG. 2 is an array controller, a pair of magnetic disc recorders, computer means, computer memory and other apparatus. Under overall control of the computer, the array controller sends out commands which are sent to each of the array terminals and which cause them to carry out certain operations on the received signals. On other commands these processed signals are converted to digital form and relayed through each of the series-connected terminals to the recording unit where they are stored on one of the two magnetic discs.

Samples of the detected signals are called for at discrete digitizing intervals, all of which are sent serially, and stored in selected first locations on the disc. When all of the subsequent digitizing intervals are completed, one complete record has been recorded. The computer in the recording unit sends a signal to the radio antenna 65, to the antenna 34 at the seismic source 14, to the sweep generator 32, power amplifier 30, to carry out a second series of impulses, or sweeps on the ground surface 24 by means of the vibrator 28, for example. This second elastic wave signal, or sweep, is transmitted downwardly as rays 38 to interface 27 where they are reflected upwardly as rays 42 to the recording array network 10. An additional record is digitized and transmitted, interval by interval, to the recording unit. These are recorded on the same disc, and are later summed, and further composited with subsequent records, to provide a stacked set of records.

On command from the computer and under control of the array controller, the stacked records are read off the disc in demultiplexed form and stored in the computer core memory in the form of individual traces. These data are now in the form for trace processing by means of the computer and the fast Fourier transform box.

Referring to FIG. 2 there is shown a plurality of array terminals 44A, 44B . . . 44N. Each of these have a plurality of M separate detectors, or geophones, numbered 46A1, 46A2 . . . 46AM. These are brought in to the array terminals by means of separate pairs of conductors 45A1 to 45AM, for example. In the array terminals each of the separate analog signals from the detectors are processed in a particular way. They are amplified by a constant gain amplifier. They are then added to a shifting function of selected amplitude. The sum of the signal plus the added shifting function are sent to an axis-crossing-coder. On command from the array controller the AXC generates a set of short pulses indicative of the instantaneous polarity of the sum signal on their inputs. These bits are stored in a parallel-to-serial converter in each of the terminals. On command from the array terminal these bits are read out in series and transmitted to the recording unit where they are recorded serially on the disc.

While this recording system can be used with any type of data processing in the array terminals, it is particularly advantageous for use in a system in which the detected signals are added to a shifting function and axis-crossing-coded to provide a train of single bits, one for each of the M channels in the terminal. This system of processing in the terminals is completely described in a copending application filed on the same date as this application and entitled "DATA ACQUISITION TRANSPORT AND STORAGE SYSTEM," Ser. No. 358,077 which application is incorporated into this application by reference. Therefore, since all detail is shown in the companion application there is no need for further description at this time.

There are a plurality of array terminals 44A, 44B . . . 44N, each of which are connected in series by multiple conductor cables 18A, 18B . . . 18N. In each of the array terminals there is a logic network which controls the reception of the commands from the array controller, and the retransmission of all commands to the other array terminals. Also, there are a pair of buffer storage units, such that on command from the array controller each terminal reads out the data stored in its parallel-to-serial converter and transmits it by a pair of conductors in the multiple conductor cable to the next-in-series array terminal towards the recording unit. As the data are transmitted to the succeeding terminals and stored on one buffer, the data previously stored on the other buffer is transmitted onto the next-in-series terminal and so on so that there is a constant stepwise movement of the digital trains from the farthermost terminal to the innermost terminal, and to the disc.

There are individual control clocks in each of the terminals by which the operations of coding, storing and reading-out data to the next terminal are timed. This clock is also transmitted to the next terminal, so that in the next terminal the data can be stored in a buffer in timing with the clock in the preceding terminal, so that it is read out of the buffer in one terminal, and into the buffer in the second terminal exactly in synchronism. When the data in the second terminal are to be transmitted to the third terminal, they are read out in time with the clock in the second terminal, which clock is also transmitted to the third terminal, so that it can be stored synchronously in a buffer in the third terminal, and so on.

The magnetic disc that receives the digital bit trains is controlled by the computer to run at precisely constant speed. It is designed to generate a pulse once each revolution, which is used to control the commands which are sent from the array controller to the array terminals. There are also pulses generated by the disc in its rotation, which are in correspondence with the individual bit positions passing under the reading or writing head, as the disc rotates. This is called the bit clock or disc clock, and is the means by which data are read out of a buffer storage in the array controller and onto the disc, and off the disc, at a rate which is precisely in synchronism with the rate of passage of each storage bit position under the write or read head.

On the disc are a plurality of independent tracks, up to 256, each of which has one head, which can be used sequentially as a write head or a read head. The array controller 48 has two discs 50A and 50B which are driven by a disc control 52. This receives coded signals by lead 55 from the array controller which are received by data and control bus 58 from the computer. The disc control sets the speed of both discs such that one of them (disc A, for example, which will be the recording disc at the moment) is running at precisely correct speed. When all of the channels have been digitized at all of the assigned digitizing intervals, one complete record has been recorded on the disc A, for example.

\ll of the data coming will be in the form of one bit vords, for each of the MN channels, for each of the ligitizing intervals. These will be stored in what are :alled the first spaced storage positions. This is the first ecord.

Next the computer will signal by lead 63 to the radio ı4 and antenna 65 to the antenna 34 at the vibrator, to epeat the generation of a control signal or sweep, by ınit 32, amplify this by means 30 to drive the vibrator :8 and impress on the earth surface 24 a repetition of he original elastic wave signal. The processing and ecording of this second record proceeds in a manner imilar to the first. However, in the course of recording hese bits of the second record, the bits of the first ecord originally recorded in the first spaced locations re read out, passed through an adder and to a buffer torage, while the second set of bits are recorded in the ame first spaced positions. The first record is then read ut of the buffer storage and onto the disc in a set of econd spaced positions on the disc. These are eight bit ·ositions, such that each digitizing interval can provide summed word of as many as eight bits, corresponding ɔ a total of 127 repetitive records and composites.

The process is to record a first record in the first ɔcations. When the second record is being recorded it oes into the first locations and the first record is read ut and placed in the second locations. When the third ecord is being recorded it goes into the first locations nd the second and first records are read out, added nd replaced on the disc in the second spaced locaons, as a first sum record and so on, until all of the lurality of repetitions have been completed. This proides a stacked set of records. This can then be read out f the disc in demultiplexed form and stored as individal traces in the computer core memory for later proessing.

The portion of this description concerning the multile terminals and their logic control, etc., has been escribed in great detail in a companion copending pplication entitled "DATA ARRAY NETWORK YSTEM," which is introduced into this application by eference. Full details of the array network are shown ı this companion copending application and there is o need for more detail at this time.

'The operation of the array controller and the disc ystem is fully described in a copending companion pplication entitled "DATA ACQUISITION AND RRAY CONTROL SYSTEM," Ser. No. 358,078 'hich is incorporated into this application by refernce. Reference can be made to this application for all etails of the array controller and the disc and the ıatter of loading and reading out data from the discs.

The computer 62 is the primary control of the entire ecording system. It is the computer that provides comıands by lead 61 and bus 58 to the array controller 48 :lling it what records to run, how many repetitions, 'hat digitizing intervals and what length of record, etc. hereafter, the array controller controls the discs and ıe entire system to the array terminals. The disc con'ols the timing. Once the complete record has been :acked on a disc the control then runs back to the omputer to have this data read off the disc in demultilexed form to the core memory 60 by way of leads 58 nd 59. There it is stored as separate traces. The comuter now can take the separate traces stored in the ɔre memory 60 as eight bit words, and by means of the FT (for example) process this data by correlation, ɔnvolution, or other data processing techniques, and to store the resulting computed data on the disc 70 through leads 61, 58, 66 and 69. The disc controller 68 and disc 70 are required because the processing of the data between the core memory, the FFT and the computer is so rapid that the disc must be provided to store the resulting computed data.

The value of the computer system at the same location as the data recorder, namely, the discs A and B, is that the data recorded for example in vibroseis form, can be correlated immediately and the resulting correlogram record displayed in one of several ways. Because it may take as many as 15 to 20 or 30 seconds to record one record and many times that to record a stacked set of records it is possible, while one disc is being loaded up with the records to process the data from the previous disc in the computer. Thus, many processing operations can be completed in the same period of time that is required to record the second set of stacked records.

With a delay of only one set of stacked records, the processing can be done in substantially "real time" with the recording. It is therefore possible to view the processed data immediately in order to make decisions regarding the field operations. For example, it is possible to view the stacked records at various times throughout the processing to see whether the quality of the data is sufficiently high so that no further repetitions of the sweep would be acquired. It is possible to devise a means of comparing the quality of the records between two stages, where they have been, let us say, R repetitions, and R+X repetitions for example. If statistically the record quality is satisfactory the further compositing can be eliminated and the crew moved to the next location, with a consequent saving of time, while being assured of the record quality.

Shown in FIG. 2 are some accessory apparatus such as the printer plotter 78 which is controlled through leads 76 from the printer plotter controller 74, from the bus 58 of the computer by line 73. On command to the computer the printer plotter can display one or more traces or records as desired while they are on the disc 70 and so on. Also, there is a graphic terminal 87 and keyboard 88 by means of which instructions can be given to the computer through line 86 and displayed on the terminal. Also, data can be called for from the computer to be printed out by printer 92 over lead 90.

When all of the processing of a set of stacked records is complete, the disc 70 is unloaded to one or the other of magnetic tapes 84A or 84B for storage for later processing or for archival storage, or for delivery to the principal computer center. It is possible, for example, as the data are passed into core memory in trace form to have them played out of the memory by the computer onto one or the other of the tapes as a permanent record of the inputed data. Similarly, processed data at any stage of processing can be stored on one or the other of the tapes 84A, 84B.

The principal improvements of this system are the means by which the field data can be detected, preprocessed, converted to digital form, transmitted to a storage means and stored on the disc in such a way that successive records can be composited, until a sufficient number have been recorded to provide a suitable stacked set of records. The entire control of the recording process is under the timing control of the disc which is the center of timing operations. When a complete set of stacked records have been composited they are then read off, converted to trace form, recorded on tape and/or processed through the FFT and so on, to provide an immediate processed record for display, in consideration of the next step in the field operation. This substantially real-time-processing and recording is invaluable in that it provides the operator with an immediate display of his results, permitting him to make whatever changes are necessary in operating procedure, so as to obtain the best possible records.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. A seismic exploration system comprising:

a. means for generating seismic disturbances in the earth;

b. a plurality of spaced detectors for generating a plurality of analog signals in response to said seismic disturbances after traveling through the earth;

c. means for amplifying said analog signals, adding to each signal a shifting function to form a sum signal and zero-crossing-coding said sum signals and storing said coded signals;

d. means on command from a rotating magnetic disc storage means for sequentially reading out said stored coded signals in the form of a plurality of trains of digital bit signals and transmitting them through a single pair of conductors to said disc storage means;

e. means for storing said trains of digital bit signals on rotating magnetic disc means in first selected spaced relation, the time of read out of said signals being dependent upon the instantaneous position of said disc as it rotates.

2. The seismic system as in claim 1 including:

a. means to repeat said generation of said seismic disturbance in the earth and means for forming a second train of digital bit signals;

b. means on said disc to store said second train of bit signals in said first selected spaced relation;

c. means on said disc to read out said first train of bits and to store same in second selected spaced relation, the times of read out and recording being dependent upon the instantaneous position of said disc as it rotates.

3. The seismic system as in claim 2 including:

a. means to repeat said generation of said seismic disturbance in the earth and means for forming a third train of digital bit signals;

b. means on said disc to store said third train of bit signals in said first selected spaced relation;

c. means on said disc to read out said second train of bits from the first spaced positions, and to read out said first train of bits from the second spaced positions;

d. means to add said first and second trains of bits to form a sum train of bits; and e. means to store said sum train of bits in said second selected spaced relation on said disc, the times of read out and recording being dependent upon the instantaneous position of said disc as it rotates.

4. The seismic system as in claim 3 including computer means and means responsive to said computer means and said disc means to read out from said disc in single trace-temporal order, the sum trains of bits stored on said disc; and memory storage means responsive to said computer means to store said single trace-temporal order trains of bits.

5. The method of carrying out geophysical seismic operations comprising:

a. generating a first elastic wave signal in the earth;

b. at a plurality of spaced locations distant from the point of application of said elastic wave signals detecting the elastic wave signals in the earth after transmission through the subsurface by a plurality of geophones to form a plurality of analog electrical signals representative of said detected elastic wave signals;

c. processing the signals from said geophones by amplifying at constant gain, adding to said amplified signals amplitude controlled shifting functions to provide sum signals, and transmitting the sum signals to axis-crossing-coders;

d. controlling said AXC to provide coded pulses representative of the instantaneous timing of said pulses with respect to the axis-crossing times of said sum signals, e. storing these coded pulses for a plurality of geophone channels;

f. reading out said stored coded signals, in serial order, from each of said plurality of geophones, and transmitting them on a two conductor cable to a constant speed rotating magnetic disc means in selected spaced addresses on the multiple tracks of said disc means.

6. The method as in claim 5 including computer means, and the steps, responsive to said computer means and said disc, of reading out said stored coded signals in single trace-temporal order; and storing said single trace-temporal order signals in a computer memory.

7. In a seismic geophysical system including a source of elastic waves which can be repeated on command and a plurality of geophones spaced on the earth's surface in a predetermined geometrical array adapted to receive the elastic waves propagated from said source after traveling through the subsurface, the improvement comprising:

a. a plurality of N array terminals;

b. each array terminal providing a plurality of M pairs of conductors of selected lengths, each pair connected to at least one geophone;

c. each of the array terminals connected by cables in series from a recording truck to a first array terminal and from the first, to a second terminal and so on, so that all array terminals are in series connection, there being a plurality of ports or connection receptacles in each of the array terminals for the connection of the cable plugs;

d. the cables to be composed of at least one pair of signal conductors, a plurality of control conductors, and a plurality of power conductors;

e. means inside of each array terminal, in response to a command from an array controller, to transmit a coded signal to the array controller which indicates which of the plurality of ports are connected to cables;

f. in each array terminal a plurality of M similar data processing channels including:

1. high gain amplifier means,
2. shifting function generator means,
3. means to add the signal from said amplifier to the shifting function from said generator, and to pass the sum signal to an axis-crossing coder means,
4. parallel-to-serial converter means having a plurality of M parallel input channels each of which is connected to one of said M coder means;

g. means to control each of said AXC simultaneously, at selected intervals of time, to sample the sum signal and to create a pulse of +1 or 0, indicative of its timing compared to the time of the axis crossing of the sum signal;

h. means in response to a command from an array controller to read out from said converter the series of bits stored therein, in sequential order, the first group of M bits from the first terminal, the second group of M bits from the second terminal and so on until all N terminals have responded, said bits formed in a train of NM bits on said single pair of signal conductors;

i. at the array controller, means to store these sequential bit signals transmitted by the array terminals on a speed-controlled magnetic recording disc means at first preselected spaced locations;

j. means to repeat the transmission of the elastic wave signal and means to process each of the geophone signals as before, to produce a second train of bits, and means on command from said array controller to transmit to and to record on said disc said second train of bits in said first spaced locations;

k. means to read out from said disc said first train of bits from said first locations and means to store said first train in second spaced positions on said disc;

l. means to read out said first and second trains to form a train of first sum words and to store said first sum words in said second locations; and m. means responsive to computer means and said array controller means to read out said train of sum words in single trace-temporal order and to store same in computer memory.

* * * * *